(12) United States Patent
Kondo et al.

(10) Patent No.: US 12,077,158 B2
(45) Date of Patent: Sep. 3, 2024

(54) TRAVEL CONTROLLER, METHOD FOR TRAVEL CONTROL, AND NON-TRANSITORY COMPUTER-READABLE MEDIUM CONTAINING COMPUTER PROGRAM FOR TRAVEL CONTROL

(71) Applicant: TOYOTA JIDOSHA KABUSHIKI KAISHA, Toyota (JP)

(72) Inventors: Suzuka Kondo, Nishitokyo (JP); Eiki Kitagawa, Tokyo-to (JP); Shota Fujii, Tokyo-to (JP); Yu Okada, Ichikawa (JP); Takuo Kaneko, Tokyo-to (JP); Soichi Yoshino, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 17/705,083

(22) Filed: Mar. 25, 2022

(65) Prior Publication Data
US 2022/0306105 A1    Sep. 29, 2022

(30) Foreign Application Priority Data

Mar. 25, 2021    (JP) ................. 2021-052077

(51) Int. Cl.
*B60W 30/16*    (2020.01)
*B60W 50/14*    (2020.01)

(52) U.S. Cl.
CPC ............ *B60W 30/16* (2013.01); *B60W 50/14* (2013.01); *B60W 2552/05* (2020.02);
(Continued)

(58) Field of Classification Search
CPC .. B60W 30/16; B60W 50/14; B60W 2552/05; B60W 2552/10; B60W 2552/53;
(Continued)

(56) References Cited

U.S. PATENT DOCUMENTS 11,807,239 B2 *   11/2023   Eigel ................. B60W 10/20
2017/0082452 A1 *   3/2017   Sumizawa ......... B60W 60/001
(Continued)

FOREIGN PATENT DOCUMENTS

JP    2017-010463 A    1/2017
JP    2018-101199 A    6/2018
(Continued)

OTHER PUBLICATIONS

JP-2020067711-A English translation (Year: 2024).*

*Primary Examiner* — Jelani A Smith
*Assistant Examiner* — Paul A Castro
(74) *Attorney, Agent, or Firm* — Oliff PLC

(57) ABSTRACT

A travel controller detects a vehicle traveling behind a host vehicle from situation data depending on the situation around the host vehicle; controls travel of the host vehicle to maintain a predetermined distance or more between the host vehicle and the detected vehicle behind; causes the host vehicle to perform a first action when the distance between the host vehicle and the vehicle behind is greater than a distance threshold; causes the host vehicle to perform a second action when the distance is less than the distance threshold, the second action contributing to safe travel of the host vehicle more than the first action; sets the distance threshold at a first value when a travel situation around the host vehicle does not satisfy a predetermined short-distance condition; and sets the distance threshold at a second value smaller than the first value when the travel situation satisfies the short-distance condition.

4 Claims, 5 Drawing Sheets

(52) U.S. Cl.
CPC ..... *B60W 2552/10* (2020.02); *B60W 2552/53* (2020.02); *B60W 2554/4041* (2020.02); *B60W 2554/802* (2020.02); *B60W 2556/40* (2020.02); *B60W 2754/30* (2020.02)

(58) Field of Classification Search
CPC ... B60W 2554/4041; B60W 2554/802; B60W 2556/40; B60W 2754/30; B60W 30/18163; B60W 30/12; B60W 2420/403; B60W 2556/50
See application file for complete search history.

(56) References Cited

U.S. PATENT DOCUMENTS

| | | |
|---|---|---|
| 2019/0304309 A1 | 10/2019 | Sakamoto et al. |
| 2020/0283027 A1 | 9/2020 | Okuyama |
| 2020/0307579 A1 | 10/2020 | Mizoguchi |

FOREIGN PATENT DOCUMENTS

| | | | |
|---|---|---|---|
| JP | 2020067711 A | * | 4/2020 |
| JP | 2020-166393 A | | 10/2020 |
| WO | 2019/064349 A1 | | 4/2019 |

* cited by examiner

TRAVEL CONTROLLER, METHOD FOR TRAVEL CONTROL, AND NON-TRANSITORY COMPUTER-READABLE MEDIUM CONTAINING COMPUTER PROGRAM FOR TRAVEL CONTROL

FIELD

The present disclosure relates to a travel controller and a method for controlling travel of a vehicle and to a non-transitory computer-readable medium having a computer program therefor stored therein.

BACKGROUND

A travel controller that automatically controls travel of a host vehicle, based on images of its surroundings generated by a camera mounted on the vehicle, detects a vehicle behind from these images and controls travel of the host vehicle to maintain a predetermined distance or more between the vehicles.

International Publication No. 2019/064349 (hereafter "Patent Literature 1") describes a travel controller that announces switching of a travel state from autonomous driving to manual driving when a vehicle behind exists within a predetermined range of a host vehicle before a high difficulty point where the host vehicle has high difficulty in autonomous driving. The travel controller described in Patent Literature 1 enables a driver to pass the high difficulty point by manual driving before the vehicle behind approaches.

SUMMARY

Depending on the situation in which travel of a host vehicle is controlled, the distance to a vehicle behind may be expected to decrease. For example, when the host vehicle makes a lane change to a lane diverging from its travel lane, a travel controller needs to decelerate the vehicle before the lane change because the regulation speed is lower in the diverging lane than in the travel lane. If another vehicle is traveling on the travel lane at a constant speed behind the host vehicle, the distance between the decelerating host vehicle and the vehicle behind traveling at a constant speed will decrease.

Even if the distance between the host vehicle and the vehicle behind decreases to a certain extent, the vehicle behind traveling on the travel lane will not cause danger because the host vehicle will make a lane change to the diverging lane. However, the distance between the host vehicle and the vehicle behind falls below a safety distance, which is set for maintaining safety of travel on the travel lane, and thereby the travel controller causes the host vehicle to take action contributing to safety, such as cancellation of the lane change under autonomous driving, to ensure safety. This action will result in the travel controller causing the host vehicle to continue travel on the travel lane or requesting the driver to switch to manual driving, which prevents an appropriate lane change to the diverging lane under autonomous driving, making the travel controller less useful. Additionally, the change in motion of the host vehicle will require the vehicle behind to change its motion.

It is an object of the present disclosure to provide a travel controller that enables a host vehicle to take action appropriately depending on the situation around the vehicle.

A travel controller according to the present disclosure includes a processor configured to detect a vehicle traveling behind a host vehicle from situation data depending on the situation around the host vehicle. The situation data is outputted by a sensor mounted on the host vehicle. The processor of the travel controller is further configured to control travel of the host vehicle to maintain a predetermined distance or more between the host vehicle and the detected vehicle behind; cause the host vehicle to perform a first action when the distance between the host vehicle and the vehicle behind is greater than a distance threshold; and cause the host vehicle to perform a second action when the distance is less than the distance threshold. The second action contributes to safe travel of the host vehicle more than the first action. The processor of the travel controller is further configured to set the distance threshold at a first value when a travel situation around the host vehicle does not satisfy a predetermined short-distance condition for determining whether the distance may decrease; and set the distance threshold at a second value smaller than the first value when the travel situation satisfies the short-distance condition. The travel situation at least includes a situation detected from the situation data, a situation around the current position of the host vehicle obtained from storage containing map information, or a situation that the host vehicle will make a lane change.

Preferably, the short-distance condition of the travel controller according to the present disclosure includes a condition that the host vehicle will make a lane change to a lane diverging from a travel lane of the host vehicle ahead; the first action includes making the lane change; and the second action includes canceling the lane change.

Preferably, the short-distance condition of the travel controller according to the present disclosure includes a condition that a regulation speed decreases ahead on a travel lane of the host vehicle; the first action includes continuing travel on the travel lane; and the second action includes a lane change from the travel lane to another lane.

Preferably, the first action of the travel controller according to the present disclosure includes notification to a driver of the host vehicle in first mode; and the second action includes notification to the driver in second mode more influential than the first mode.

A method for travel control according to the present disclosure includes detecting a vehicle traveling behind a host vehicle from situation data depending on the situation around the host vehicle. The situation data is outputted by a sensor mounted on the host vehicle. The method further includes controlling travel of the host vehicle to maintain a predetermined distance or more between the host vehicle and the detected vehicle behind; causing the host vehicle to perform a first action when the distance between the host vehicle and the vehicle behind is greater than a distance threshold; and causing the host vehicle to perform a second action when the distance is less than the distance threshold. The second action contributes to safe travel of the host vehicle more than the first action. The method further includes setting the distance threshold at a first value when a travel situation around the host vehicle does not satisfy a predetermined short-distance condition for determining whether the distance may decrease; and setting the distance threshold at a second value smaller than the first value when the travel situation satisfies the short-distance condition. The travel situation at least includes a situation detected from the situation data, a situation around the current position of the host vehicle obtained from storage containing map information, or a situation that the host vehicle will make a lane change.

A computer program for travel control stored in a non-transitory computer-readable medium according to the present disclosure causes a processor to execute a process including detecting a vehicle traveling behind a host vehicle from situation data depending on the situation around the host vehicle. The situation data is outputted by a sensor mounted on the host vehicle. The process further includes controlling travel of the host vehicle to maintain a predetermined distance or more between the host vehicle and the detected vehicle behind; causing the host vehicle to perform a first action when the distance between the host vehicle and the vehicle behind is greater than a distance threshold; and causing the host vehicle to perform a second action when the distance is less than the distance threshold. The second action contributes to safe travel of the host vehicle more than the first action. The process further includes setting the distance threshold at a first value when a travel situation around the host vehicle does not satisfy a predetermined short-distance condition for determining whether the distance may decrease; and setting the distance threshold at a second value smaller than the first value when the travel situation satisfies the short-distance condition. The travel situation at least includes a situation detected from the situation data, a situation around the current position of the host vehicle obtained from storage containing map information, or a situation that the host vehicle will make a lane change.

The travel controller according to the present disclosure enables the host vehicle to take action appropriately depending on the situation around the vehicle.

DESCRIPTION OF EMBODIMENTS

A travel controller that enables a host vehicle to take action appropriately depending on the situation around the vehicle will now be described in detail with reference to the attached drawings. The travel controller detects a vehicle traveling behind the host vehicle and a lane line demarcating a lane being traveled by the host vehicle from situation data depending on the situation around the host vehicle. The situation data is outputted by a sensor mounted on the host vehicle. The travel controller controls travel of the host vehicle according to the lane line. The travel controller further causes the host vehicle to perform a first action when the distance between the host vehicle and the vehicle behind is greater than a distance threshold, and causes the host vehicle to perform a second action when the distance is less than the distance threshold. The second action contributes to safe travel of the host vehicle more than the first action. The travel controller sets the distance threshold at a first value when a travel situation around the host vehicle does not satisfy a predetermined short-distance condition for determining whether the distance may decrease, and sets the distance threshold at a second value smaller than the first value when the travel situation satisfies the short-distance condition. The travel situation at least includes a situation detected from the situation data, a situation around the current position of the host vehicle obtained from storage containing map information, or a situation that the host vehicle will make a lane change.

Figure 1:
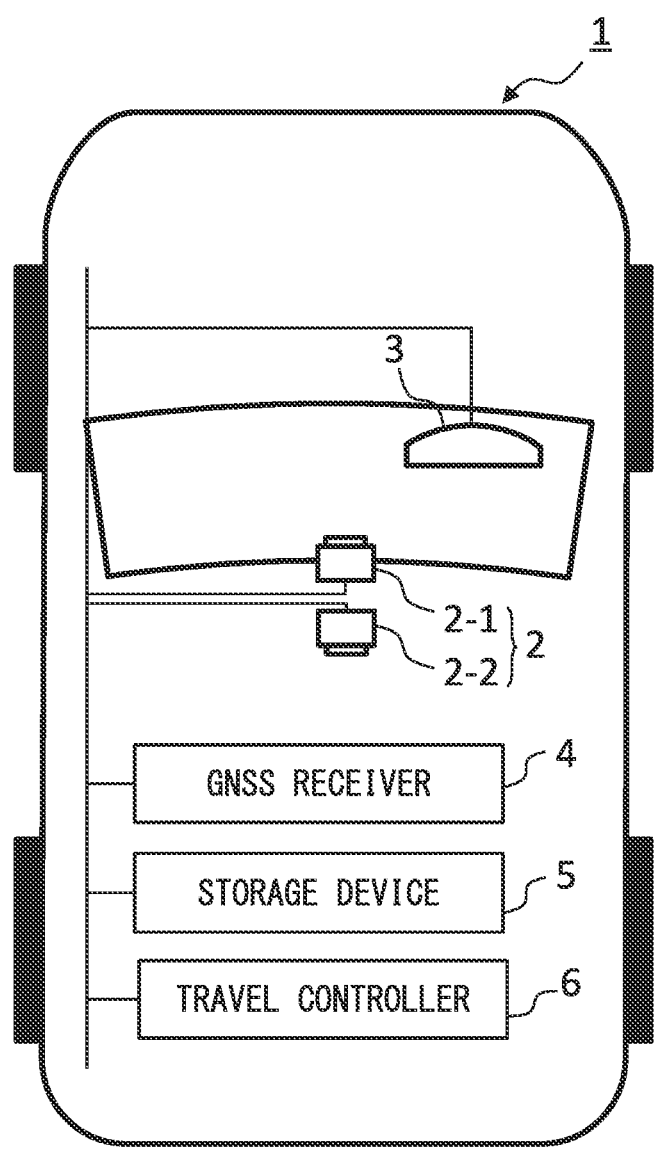
FIG. 1 schematically illustrates the configuration of a host vehicle equipped with a travel controller.

FIG. 1 schematically illustrates the configuration of the host vehicle equipped with the travel controller.

The host vehicle 1 includes a surround capturing camera 2, a meter display 3, a global navigation satellite system (GNSS) receiver 4, a storage device 5, and a travel controller 6. The surround capturing camera 2, the meter display 3, the GNSS receiver 4, and the storage device 5 are connected to the travel controller 6 via an in-vehicle network conforming to a standard, such as a controller area network, so that they can communicate with each other.

The surround capturing camera 2 is an example of a sensor for generating situation data depending on the situation around the vehicle 1. The surround capturing camera 2 includes a two-dimensional detector constructed from an array of optoelectronic transducers, such as CCD or C-MOS, having sensitivity to visible light and a focusing optical system that forms an image of a target region on the two-dimensional detector. The surround capturing camera 2 includes a front camera 2-1 and a rear camera 2-2. For example, the front camera 2-1 is disposed in a front and upper area in the interior of the vehicle and oriented forward whereas the rear camera 2-2 is disposed in a rear and upper area in the interior of the vehicle and oriented rearward. The surround capturing camera 2 takes pictures of the surroundings of the vehicle 1 through front and rear windshields every predetermined capturing period (e.g., ⅓₀ to ⅒ seconds), and outputs images of the surroundings as the situation data.

The meter display 3, which is an example of a notification device, includes, for example, a liquid crystal display. The meter display 3 displays a screen for requesting the driver to perform a predetermined action, according to a signal received from the travel controller 6 via the in-vehicle network.

The GNSS receiver 4 receives GNSS signals from GNSS satellites at predetermined intervals, and determines the position of the vehicle 1, based on the received GNSS signals. The GNSS receiver 4 outputs a positioning signal indicating the result of determination of the position of the vehicle 1 based on the GNSS signals to the travel controller 6 via the in-vehicle network at predetermined intervals.

The storage device 5, which is an example of the storage, includes, for example, a hard disk drive or a nonvolatile semiconductor memory. The storage device 5 contains a high-precision map, which includes, for example, information indicating diverging lanes and regulation speeds for each road included in a predetermined region represented in the map.

The travel controller 6 is an electronic control unit (ECU) including a communication interface, a memory, and a processor. The travel controller 6 detects lane lines and a vehicle behind from an image of the surroundings received from the surround capturing camera 2 via the communication interface, and controls travel of the vehicle 1 according to the lane lines. Additionally, the travel controller 6 causes the vehicle 1 to perform a predetermined action, depending on the distance between the vehicle 1 and the vehicle behind.

Figure 2:
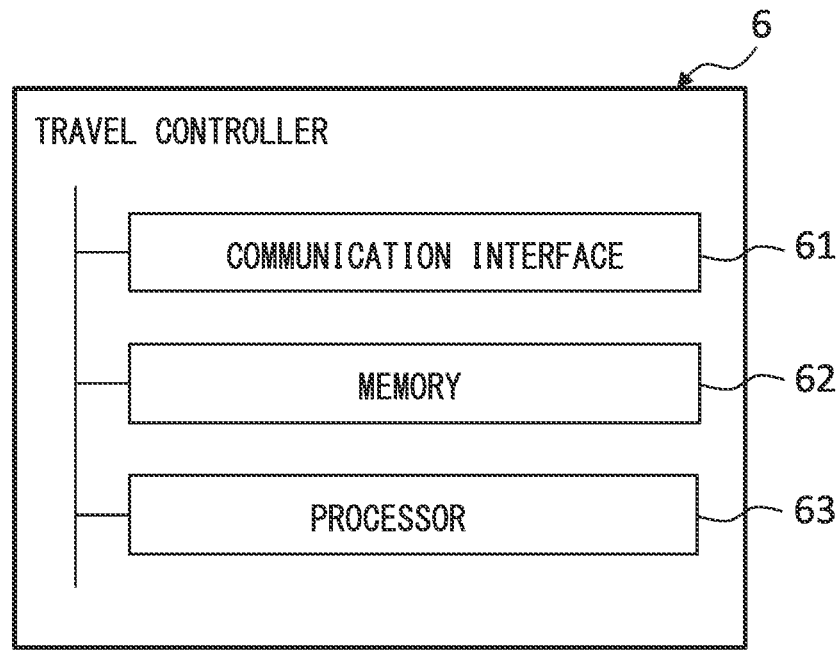
FIG. 2 schematically illustrates the hardware of the travel controller.

FIG. 2 schematically illustrates the hardware of the travel controller 6.

The communication interface 61, which is an example of a communication unit, includes a communication interface circuit for connecting the travel controller 6 to the in-vehicle network. The communication interface 61 provides received data for the processor 63, and outputs data provided from the processor 63 to an external device.

The memory 62, which is an example of a storage unit, includes volatile and nonvolatile semiconductor memories. The memory 62 contains various types of data used for processing by the processor 63. The data stored in the memory 62 includes, for example, parameters of a neural network used as a classifier to identify a vehicle behind from an image of the surroundings; actions to be performed by the vehicle 1, depending on the distance between the vehicle 1 and a vehicle behind; values used as the distance threshold for determining an action to be performed by the vehicle 1, depending on the distance therebetween; and a short-distance condition for determining whether the travel situation may cause a decrease in the distance therebetween. The memory 62 also contains various application programs, such as a computer program for travel control to execute a travel control process.

The processor 63, which is an example of a control unit, includes one or more processors and a peripheral circuit thereof. The processor 63 may further include another operating circuit, such as a logic-arithmetic unit, an arithmetic unit, or a graphics processing unit.

Figure 3:
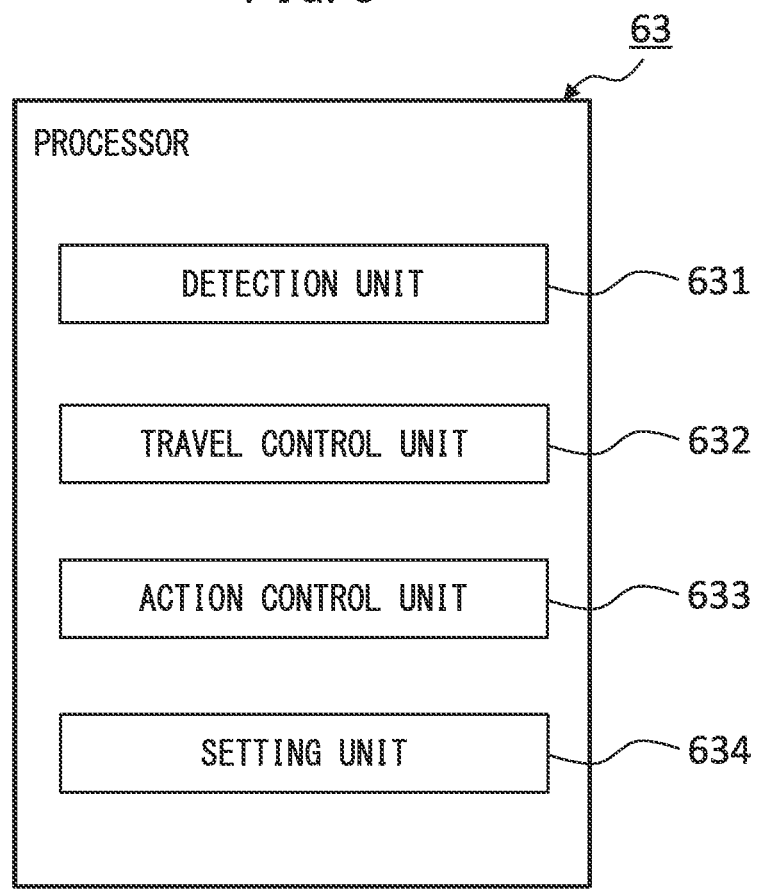
FIG. 3 is a functional block diagram of a processor included in the travel controller.

FIG. 3 is a functional block diagram of the processor 63 included in the travel controller 6.

As its functional blocks, the processor 63 of the travel controller 6 includes a detection unit 631, a travel control unit 632, an action control unit 633, and a setting unit 634. These units included in the processor 63 are functional modules implemented by a program executed on the processor 63. The computer program for achieving the functions of the units of the processor 63 may be provided in a form recorded on a computer-readable and portable medium, such as a semiconductor memory, a magnetic recording medium, or an optical recording medium. Alternatively, the units included in the processor 63 may be implemented in the travel controller 6 as separate integrated circuits, microprocessors, or firmware.

The detection unit 631 detects a vehicle traveling behind the vehicle 1 from an image of the surroundings outputted by the surround capturing camera 2.

The detection unit 631 inputs an image of the surroundings received from the surround capturing camera 2 via the communication interface 61 into a classifier that has been trained to detect a region representing a vehicle, thereby determining the position of a vehicle traveling behind the vehicle 1.

The detection unit 631 also inputs the image into a classifier that has been trained to detect a region representing a lane line, thereby determining the positions of lane lines around the vehicle 1.

The classifiers may be, for example, a convolutional neural network (CNN) including convolution layers connected in series from the input toward the output. A CNN that has been trained using inputted images representing vehicles and lane lines as training data operates as the classifiers to identify regions representing a vehicle and lane lines in an image.

The travel control unit 632 controls travel of the vehicle 1 according to the lane lines detected by the detection unit 631.

The travel control unit 632 outputs a control signal to a travel mechanism (not shown) of the vehicle 1 via the communication interface 61 to keep the current travel lane, which is one of the lanes demarcated by the detected lane lines, according to the lane lines. The travel mechanism includes, for example, an engine or a motor for powering the vehicle 1, brakes for decelerating the vehicle 1, and a steering mechanism for steering the vehicle 1.

Additionally, the travel control unit 632 outputs a control signal to the travel mechanism (not shown) of the vehicle 1 via the communication interface 61 to make a lane change from the current travel lane to a lane leading to a preset destination, according to the detected lane lines.

The action control unit 633 causes the vehicle 1 to perform a predetermined action, depending on the distance between the vehicle 1 and the vehicle behind.

The action control unit 633 calculates the distance between the vehicle 1 and the vehicle behind. For example, the action control unit 633 determines the positions of a pair of lane lines on either side of the vehicle behind. The action control unit 633 further obtains width information indicating the width of the lane corresponding to the current position of the vehicle 1 from the storage device 5 containing map information. Since the focal length of the surround capturing camera 2 is known, the distance between the vehicle 1 and the vehicle behind can be estimated from the width information and the distance between the pair of lane lines on either side of the vehicle behind in the image of the surroundings.

When the distance between the vehicle 1 and the vehicle behind is greater than the distance threshold stored in the memory 62, the action control unit 633 causes the vehicle 1 to perform a first action, which is one of the actions stored in the memory 62. When the distance between the vehicle 1 and the vehicle behind is less than the distance threshold stored in the memory 62, the action control unit 633 causes the vehicle 1 to perform a second action, which is one of the actions stored in the memory 62. The second action contributes to safe travel of the host vehicle more than the first action. When the distance between the vehicle 1 and the vehicle behind is less than the distance threshold, the action control unit 633 causes the vehicle 1 to perform the second action, which contributes to safe travel more, making travel of the vehicle 1 safer.

For example, when a lane change is planned and the distance between the vehicle 1 and the vehicle behind is greater than the distance threshold stored in the memory 62, the action control unit 633 causes the vehicle 1 to make the planned lane change as the first action. When a lane change is planned and the distance between the vehicle 1 and the vehicle behind is less than the distance threshold stored in the memory 62, the action control unit 633 causes the vehicle 1 to cancel the planned lane change as the second action. Canceling a lane change is an action contributing to safe travel more than making a lane change because it involves keeping the lane, which results in a more stable state, instead of a lane change, which may result in an unstable state.

For example, when the distance between the vehicle 1 and the vehicle behind is greater than the distance threshold stored in the memory 62, the action control unit 633 causes the vehicle 1 to continue travel on the current travel lane as the first action. When the vehicle 1 is traveling on a certain lane and the distance between the vehicle 1 and the vehicle behind is less than the distance threshold stored in the memory 62, the action control unit 633 causes the vehicle 1 to make a lane change to another lane as the second action. A lane change to another lane is an action contributing to safe travel more than continuing travel on the current travel lane because the vehicle approaching from behind can be avoided.

For example, when the distance between the vehicle 1 and the vehicle behind is greater than the distance threshold stored in the memory 62, the action control unit 633 causes the vehicle 1 to make notification to the driver of the vehicle 1 in first mode as the first action. When the distance between the vehicle 1 and the vehicle behind is less than the distance threshold stored in the memory 62, the action control unit 633 causes the vehicle 1 to make notification to the driver in second mode more influential than the first mode as the second action. For example, a display in a high temperature color (e.g., blue or white), a single beep, and a soft voice are used as the first mode. In this case, a display in a low temperature color (e.g., red or yellow), intermittent beeps, a loud voice, a sensible alarm with a seatbelt are used as the second mode more influential than the first mode. The second mode calls the driver's attention more than the first mode. The notification to the driver in second mode, which is more influential, calls the driver's attention more, and thus contributes to safe travel more than the notification to the driver in first mode.

The setting unit 634 determines whether a travel situation around the vehicle 1 satisfies the short-distance condition stored in the memory 62. The travel situation around the vehicle 1 at least includes a situation detected from an image of the surroundings received from the surround capturing camera 2 via the communication interface 61, a situation around the current position of the vehicle 1 obtained from the storage device 5 containing map information, or a situation that the vehicle 1 will make a lane change. The short-distance condition is for determining whether the travel situation may cause a decrease in the distance to a vehicle behind.

The short-distance condition includes a condition that the vehicle 1 will make a lane change to a lane diverging from a travel lane of the vehicle 1 ahead. A lane change to a diverging lane requires deceleration. Deceleration of the vehicle 1 for a lane change to a diverging lane may result in a decrease in the distance to a vehicle behind that does not decelerate.

Figure 4:
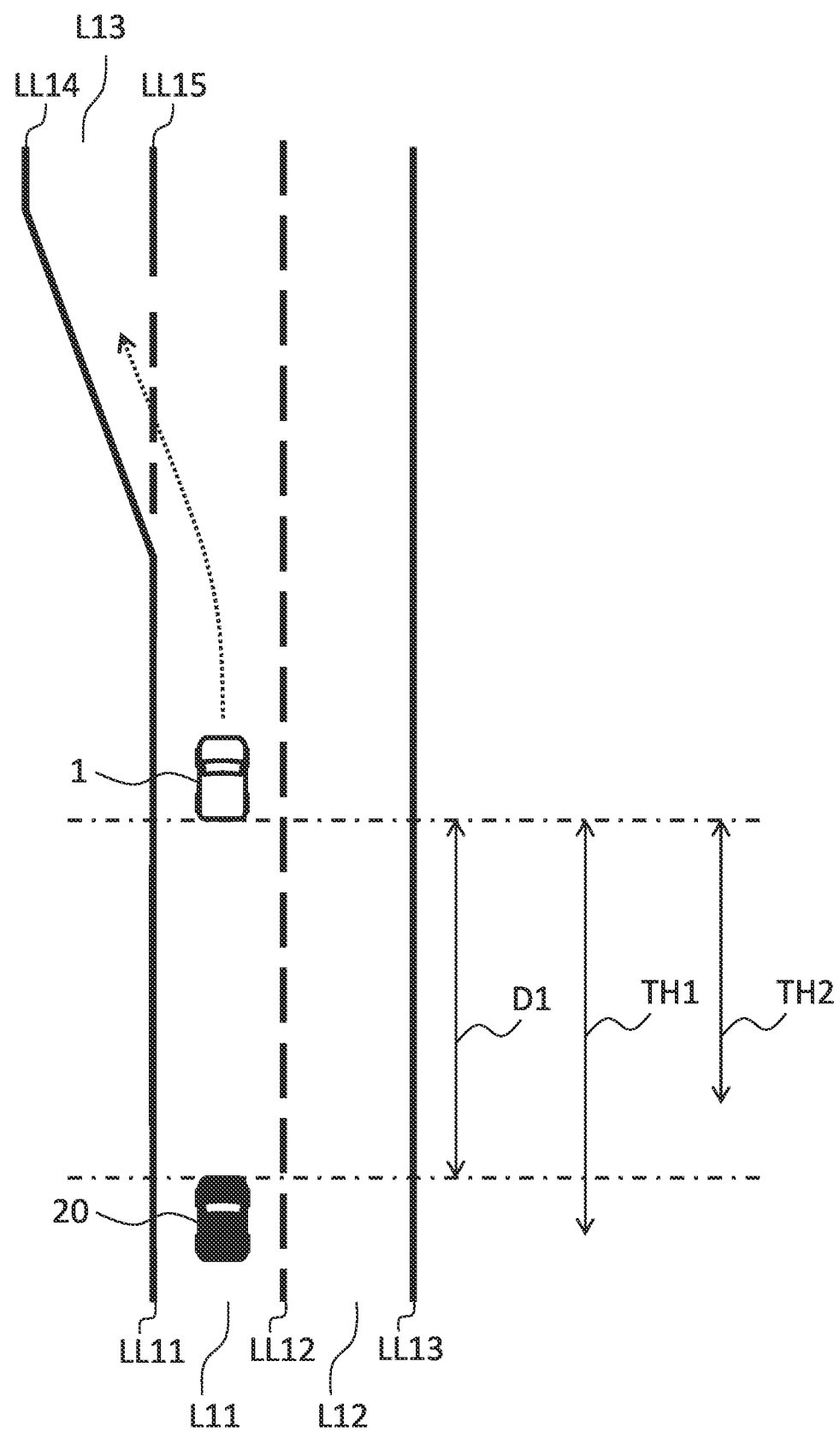
FIG. 4 is a diagram for explaining a first example of a short-distance condition.

FIG. 4 is a diagram for explaining a first example of the short-distance condition.

The setting unit 634 obtains information indicating the situation around the current position, which is determined by a positioning signal received from the GNSS receiver 4, from the storage device 5 containing a high-precision map, and determines whether a lane diverges ahead on the travel lane of the vehicle 1. The setting unit 634 also obtains information indicating whether the vehicle will make a lane change to a diverging lane from the travel control unit 632. The setting unit 634 then determines whether the travel situation around the vehicle 1, which includes the situation around the current position obtained from the storage device 5, satisfies the short-distance condition. The setting unit may determine whether a lane diverges ahead on the travel lane of the vehicle 1, based on the configuration of lane lines in the situation detected from an image of the surroundings received from the surround capturing camera 2 via the communication interface 61.

In the first example of the short-distance condition, the vehicle 1 is traveling on a lane L11 demarcated by lane lines LL11 and LL12. The lane L11 adjoins a lane L12 demarcated by lane lines LL12 and LL13. Ahead on the travel lane L11 of the vehicle 1, a lane L13 demarcated by lane lines LL14 and LL15 diverges from the lane L11. The vehicle 1 will make a lane change to the diverging lane L13. Thus the travel situation in the first example of the short-distance condition satisfies the condition "the vehicle 1 will make a lane change to a lane diverging from a travel lane of the vehicle 1 ahead."

When it is determined that the travel situation around the vehicle 1 does not satisfy the short-distance condition, the setting unit 634 sets the distance threshold at a first value (e.g., 100 m). When it is determined that the travel situation around the vehicle 1 satisfies the short-distance condition, the setting unit 634 sets the distance threshold at a second value (e.g., 80 m).

Since the travel situation around the vehicle 1 in the example of FIG. 4 satisfies the short-distance condition, the setting unit 634 sets the distance threshold at the second value TH2. In the example of FIG. 4, the distance D1 between the vehicle 1 and a vehicle 20 behind is less than the first value TH1 and greater than the second value TH2. The action control unit 633 determines that the distance to the vehicle behind is greater than the second value TH2, and causes the vehicle 1 to perform a first action.

Additionally, the short-distance condition includes a condition that a regulation speed decreases ahead on a travel lane of the host vehicle. Deceleration of the vehicle 1 to obey the decreased regulation speed may result in a decrease in the distance to a vehicle behind that has not decelerated.

Figure 5:
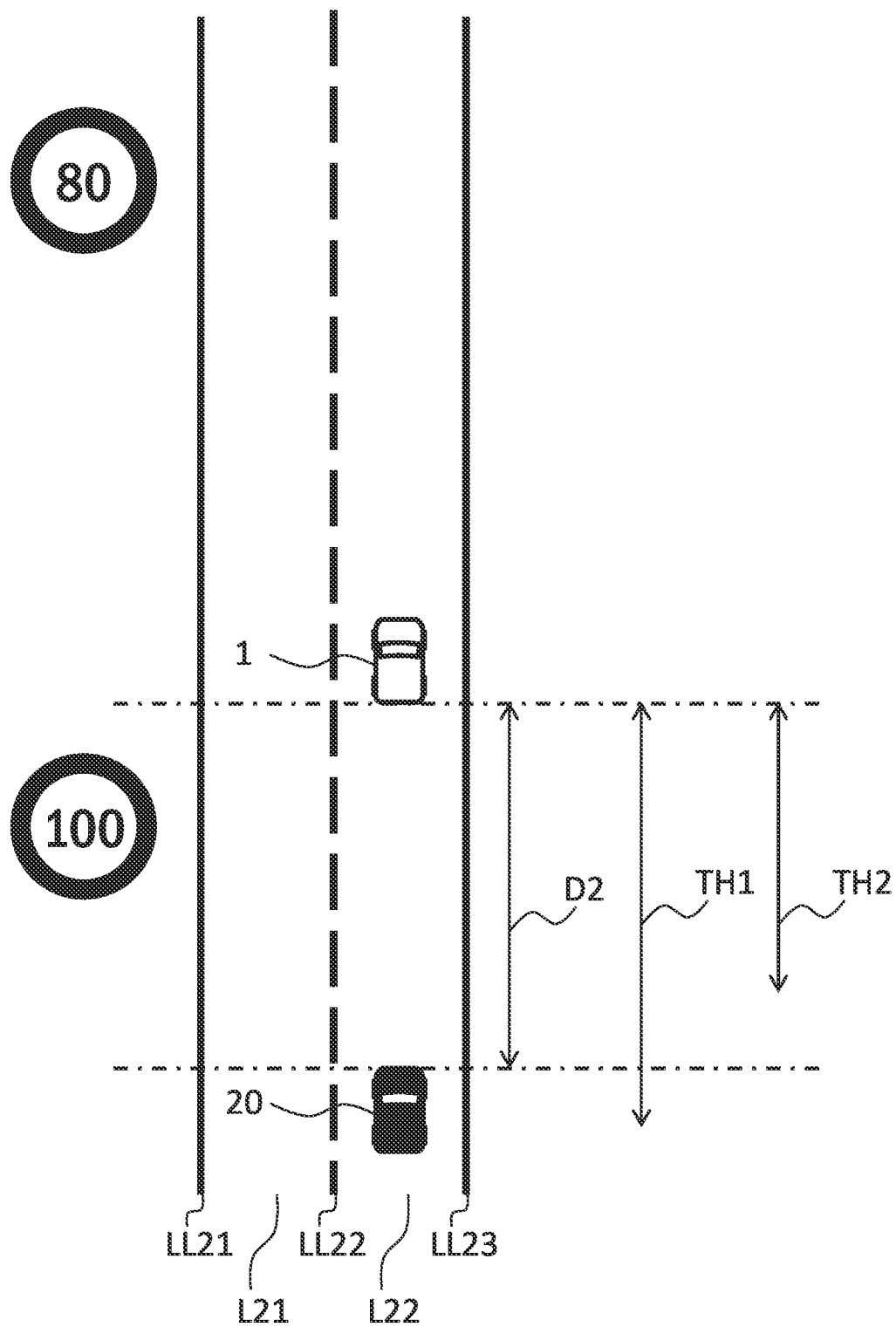
FIG. 5 is a diagram for explaining a second example of a short-distance condition.

FIG. 5 is a diagram for explaining a second example of the short-distance condition.

The setting unit 634 obtains information indicating the situation around the current position, which is determined by a positioning signal received from the GNSS receiver 4, from the storage device 5 containing a high-precision map, and determines whether the regulation speed changes ahead on the travel lane of the vehicle 1. The setting unit 634 then determines whether the travel situation around the vehicle 1, which includes the situation around the current position obtained from the storage device 5, satisfies the short-distance condition. The setting unit may determine whether the regulation speed changes ahead on the travel lane of the vehicle 1, based on a speed signpost in the situation detected from an image of the surroundings received from the surround capturing camera 2 via the communication interface 61.

The vehicle 1 is traveling on a lane L22 demarcated by lane lines LL22 and LL23. The lane L22 adjoins a lane L21 demarcated by lane lines LL21 and LL22. Ahead on the travel lane L22 of the vehicle 1, the regulation speed decreases from 100 km/h to 80 km/h. Thus the travel situation in the second example of the short-distance condition satisfies the condition "a regulation speed decreases ahead on a travel lane of the host vehicle."

When it is determined that the travel situation around the vehicle 1 does not satisfy the short-distance condition, the setting unit 634 sets the distance threshold at a first value (e.g., 100 m). When it is determined that the travel situation around the vehicle 1 satisfies the short-distance condition, the setting unit 634 sets the distance threshold at a second value (e.g., 80 m).

Since the travel situation around the vehicle 1 in the example of FIG. 5 satisfies the short-distance condition, the setting unit 634 sets the distance threshold at the second value TH2. In the example of FIG. 5, the distance D2 between the vehicle 1 and a vehicle 20 behind is less than the first value TH1 and greater than the second value TH2. The action control unit 633 determines that the distance to the vehicle behind is greater than the second value TH2, and causes the vehicle 1 to perform a first action.

Figure 6:
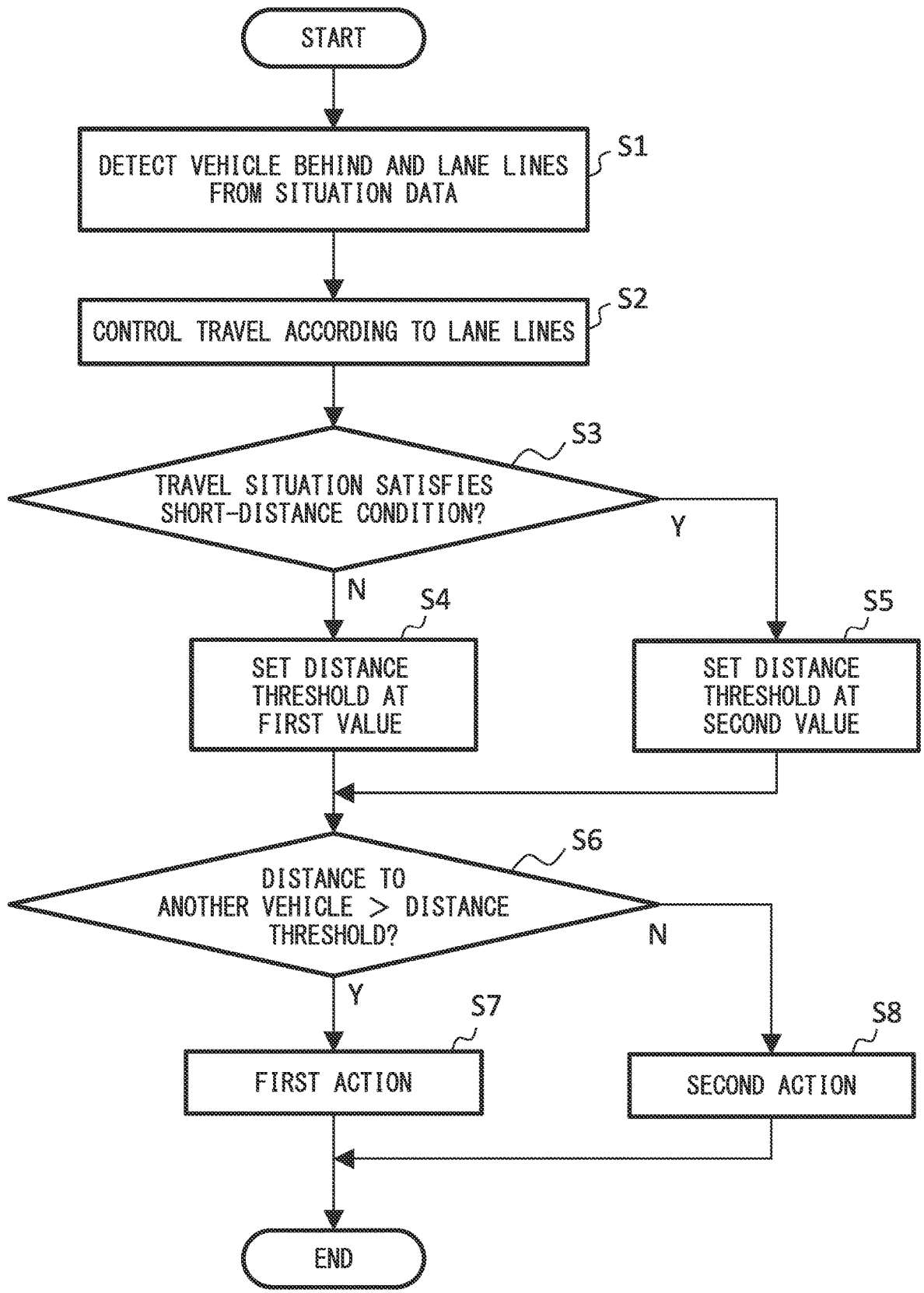
FIG. 6 is a flowchart of a travel control process.

FIG. 6 is a flowchart of a travel control process. While the vehicle 1 is traveling under autonomous driving control, the travel controller 6 repeats the process illustrated in FIG. 6 at predetermined intervals (e.g., intervals of 1 second).

First, the detection unit 631 detects a vehicle traveling behind the vehicle 1 from an image of the surroundings outputted by the surround capturing camera 2 (step S1).

Next, the travel control unit 632 controls travel of the vehicle 1 according to lane lines detected by the detection unit 631 (step S2).

Next, the setting unit 634 determines whether the travel situation around the vehicle 1 satisfies the short-distance condition stored in the memory 62 (step S3).

When it is determined that the travel situation around the vehicle 1 does not satisfy the short-distance condition (No in step S3), the setting unit 634 sets the distance threshold at a first value (step S4) and proceeds to step S6 described below.

When it is determined that the travel situation around the vehicle 1 satisfies the short-distance condition (Yes in step S3), the setting unit 634 sets the distance threshold at a second value (step S5) and proceeds to step S6 described below.

Subsequent to step S4 or S5, the action control unit 633 determines whether the distance between the vehicle 1 and the vehicle behind is greater than the distance threshold stored in the memory 62 (step S6).

When it is determined that the distance between the vehicle 1 and the vehicle behind is greater than the distance threshold (Yes in step S6), the action control unit 633 causes the vehicle 1 to perform a first action (step S7) and terminates the travel control process.

When it is determined that the distance between the vehicle 1 and the vehicle behind is less than the distance threshold (No in step S6), the action control unit 633 causes the vehicle 1 to perform a second action (step S8) and terminates the travel control process.

By executing the travel control process in this way, the travel controller 6 enables the vehicle 1 to take action appropriately depending on the situation around the vehicle 1.

According to a modified example, the vehicle 1 may include a light detection and ranging (LiDAR) sensor that generates a range image of the surroundings of the vehicle 1, as a surround capturing sensor. The action control unit 633 can use the distance indicated in that region in the range image outputted by the LiDAR sensor as situation data which corresponds to a vehicle behind as the distance between the vehicle 1 and the vehicle behind.

Note that those skilled in the art can apply various changes, substitutions, and modifications without departing from the spirit and scope of the present disclosure.

What is claimed is:

1. A travel controller comprising a processor configured to:
   detect a vehicle traveling behind a host vehicle, in a travel lane of the host vehicle, and a lane line demarcating a road being traveled by the host vehicle from situation data depending on the situation around the host vehicle, the situation data being outputted by a sensor mounted on the host vehicle;
   control travel of the host vehicle according to the lane line;
   cause the host vehicle to perform a first action when the distance between the host vehicle and the vehicle behind is greater than a distance threshold, and cause the host vehicle to perform a second action when the distance is less than the distance threshold, the second action being different than the first action;
   set the distance threshold at a first value when a travel situation around the host vehicle does not satisfy a predetermined short-distance condition for determining whether the distance may decrease; and
   set the distance threshold at a second value smaller than the first value when the travel situation satisfies the short-distance condition, the travel situation at least including a situation detected from the situation data, a situation around the current position of the host vehicle obtained from storage containing map information, or a situation that the host vehicle will make a lane change, wherein
   (i) the short-distance condition includes a condition that the host vehicle will make the lane change to a lane diverging from the travel lane of the host vehicle ahead, the first action includes making the lane change, and the second action includes canceling the lane change or
   (ii) the short-distance condition includes a condition that a regulation speed decreases ahead on the travel lane of the host vehicle, the first action includes continuing travel on the travel lane, and the second action includes the lane change from the travel lane to another lane.

2. The travel controller according to claim 1, wherein the first action includes notification to a driver of the host vehicle in a first mode, and the second action includes notification to the driver in a second mode that notifies the driver with more emphasis than the first mode.

3. A method for travel control, comprising:
   detecting a vehicle traveling behind a host vehicle, in a travel lane of the host vehicle, from situation data depending on the situation around the host vehicle, the situation data being outputted by a sensor mounted on the host vehicle;
   controlling travel of the host vehicle to maintain a predetermined distance or more between the host vehicle and the detected vehicle behind;
   causing the host vehicle to perform a first action when the distance between the host vehicle and the vehicle behind is greater than a distance threshold, and causing the host vehicle to perform a second action when the distance is less than the distance threshold, the second action being different than the first action;
   setting the distance threshold at a first value when a travel situation around the host vehicle does not satisfy a predetermined short-distance condition for determining whether the distance may decrease; and
   setting the distance threshold at a second value smaller than the first value when the travel situation satisfies the short-distance condition, the travel situation at least including a situation detected from the situation data, a situation around the current position of the host vehicle obtained from storage containing map information, or a situation that the host vehicle will make a lane change, wherein
   (i) the short-distance condition includes a condition that the host vehicle will make the lane change to a lane diverging from the travel lane of the host vehicle ahead, the first action includes making the lane change, and the second action includes canceling the lane change or
   (ii) the short-distance condition includes a condition that a regulation speed decreases ahead on the travel lane of the host vehicle, the first action includes continuing travel on the travel lane, and the second action includes the lane change from the travel lane to another lane.

4. A non-transitory computer-readable medium having a computer program for travel control stored therein, the computer program causing a processor to execute a process comprising:
  detecting a vehicle traveling behind a host vehicle, in a travel lane of the host vehicle, from situation data depending on the situation around the host vehicle, the situation data being outputted by a sensor mounted on the host vehicle;
  controlling travel of the host vehicle to maintain a predetermined distance or more between the host vehicle and the detected vehicle behind;
  causing the host vehicle to perform a first action when the distance between the host vehicle and the vehicle behind is greater than a distance threshold, and causing the host vehicle to perform a second action when the distance is less than the distance threshold, the second action being different than the first action;
  setting the distance threshold at a first value when a travel situation around the host vehicle does not satisfy a predetermined short-distance condition for determining whether the distance may decrease; and
  setting the distance threshold at a second value smaller than the first value when the travel situation satisfies the short-distance condition, the travel situation at least including a situation detected from the situation data, a situation around the current position of the host vehicle obtained from storage containing map information, or a situation that the host vehicle will make a lane change, wherein
(i) the short-distance condition includes a condition that the host vehicle will make the lane change to a lane diverging from the travel lane of the host vehicle ahead, the first action includes making the lane change, and the second action includes canceling the lane change or
(ii) the short-distance condition includes a condition that a regulation speed decreases ahead on the travel lane of the host vehicle, the first action includes continuing travel on the travel lane, and the second action includes the lane change from the travel lane to another lane.

\* \* \* \* \*